Figure 1:
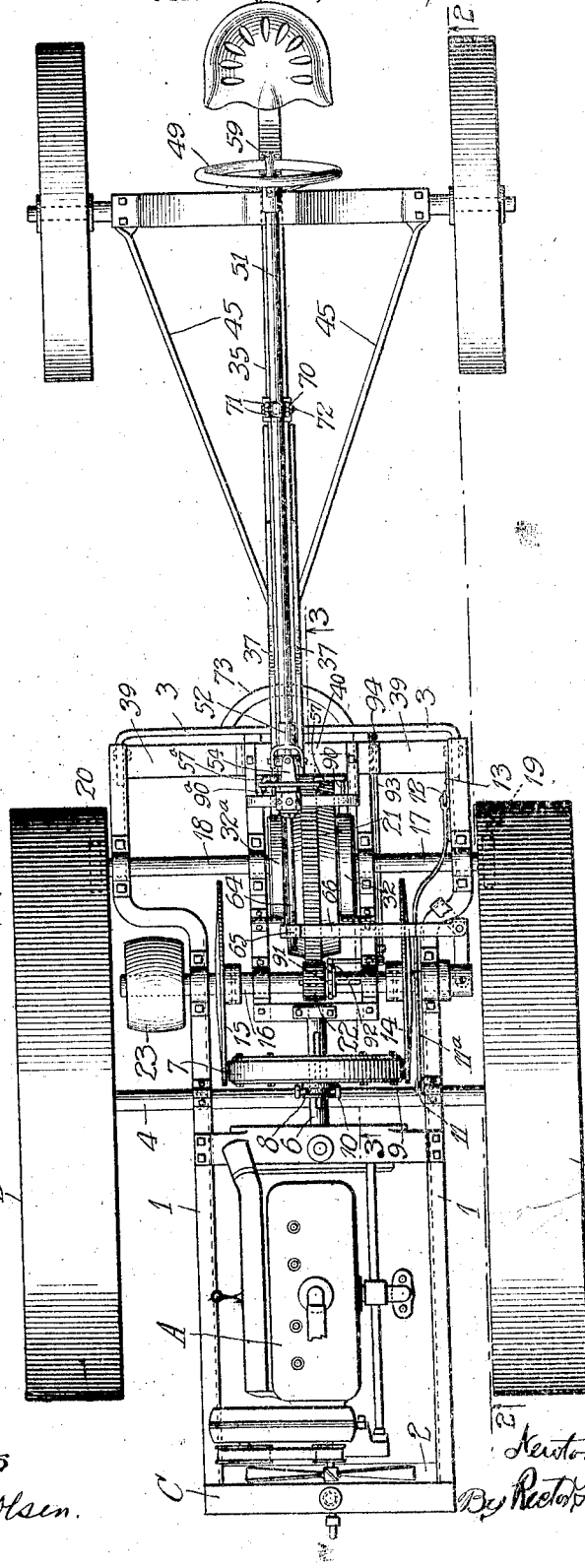

Aug. 3, 1926.

N. M. ANDERSON

TRACTOR

Filed May 31, 1921

1,594,484

5 Sheets-Sheet 1

Witness
Martin H. Olsen.

Inventor
Newton M. Anderson
By Rector Allen Davis Macaulay
his Attys

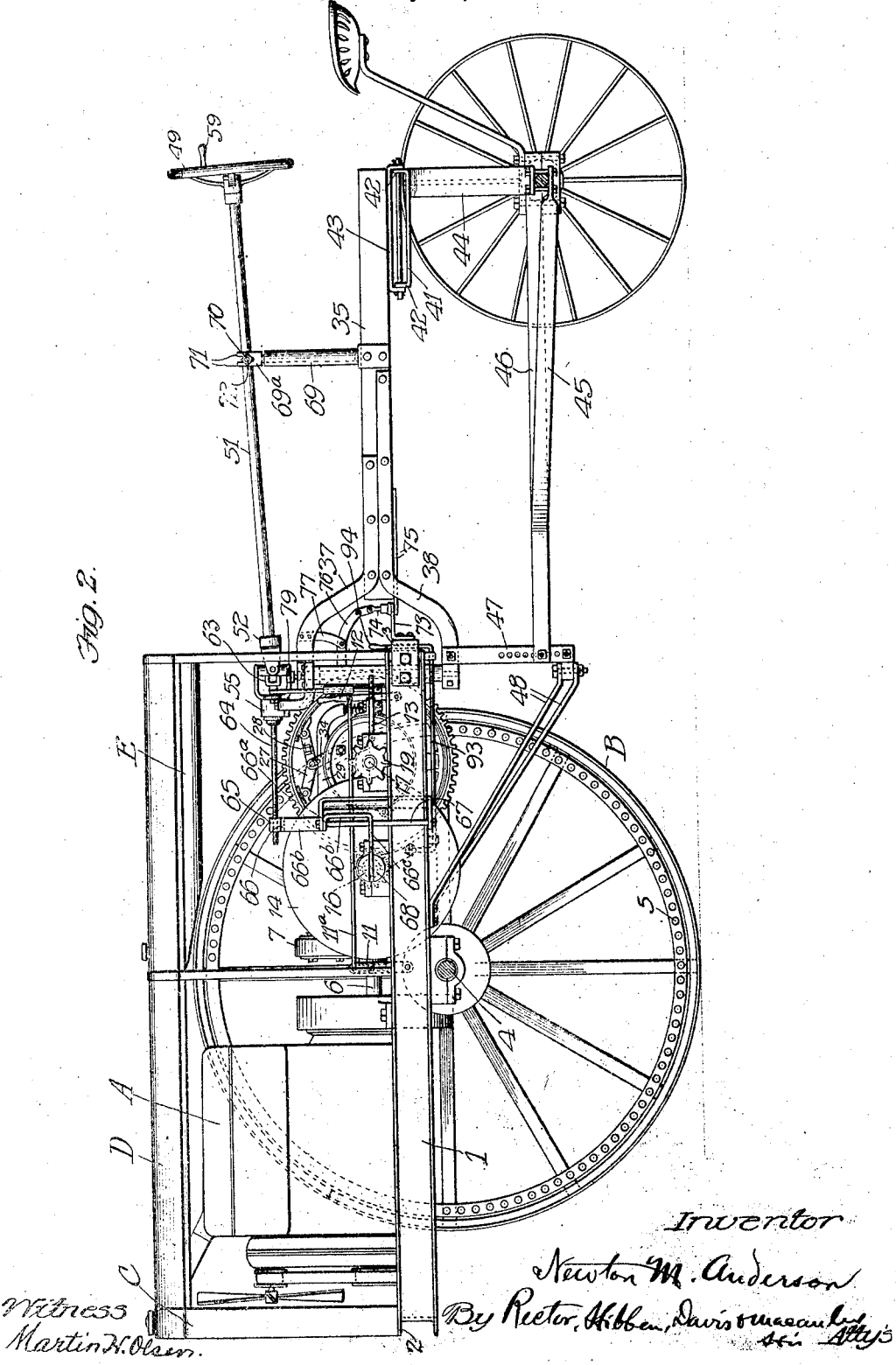

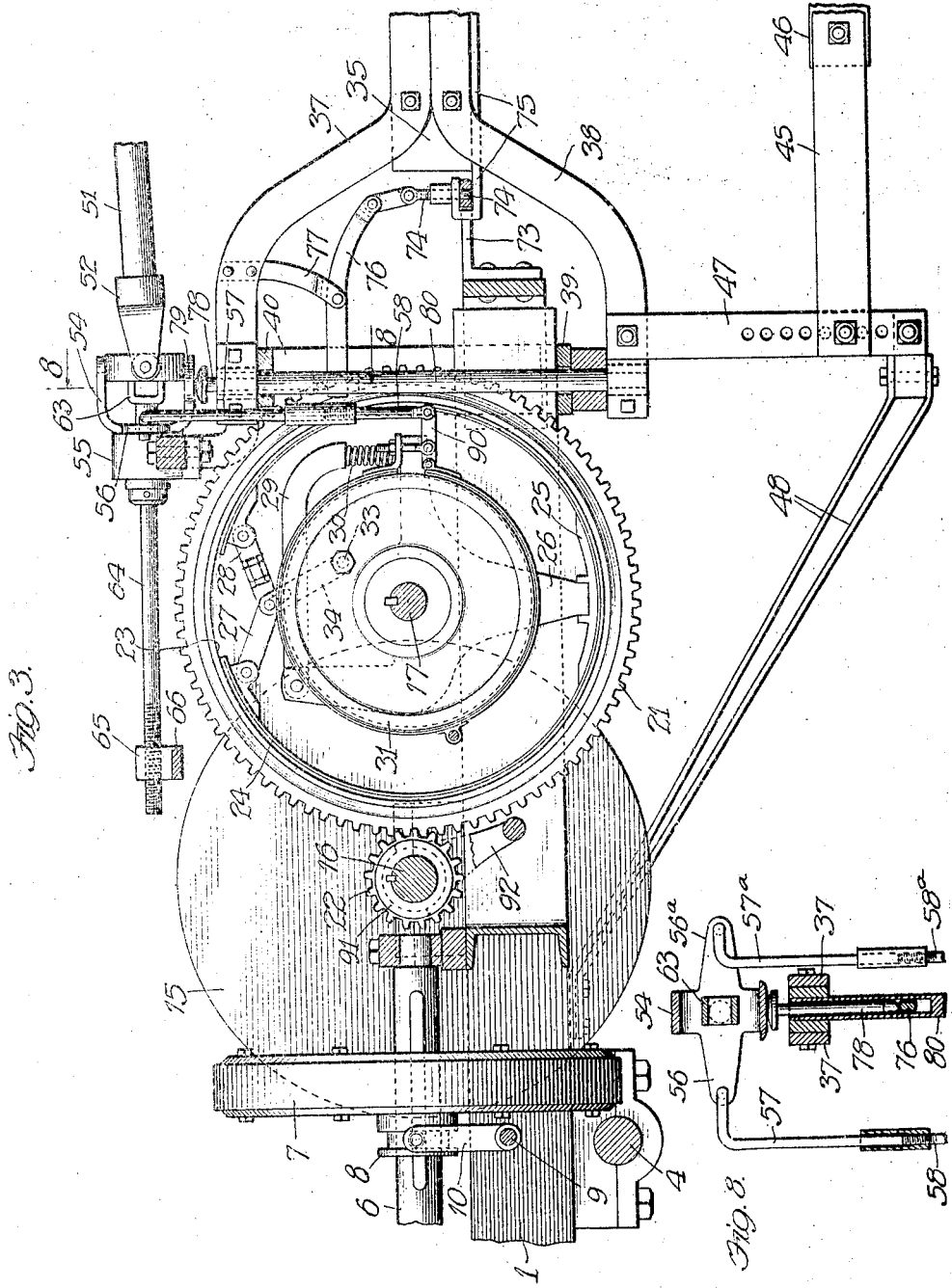

Aug. 3, 1926. 1,594,484
N. M. ANDERSON
TRACTOR
Filed May 31, 1921 5 Sheets-Sheet 4
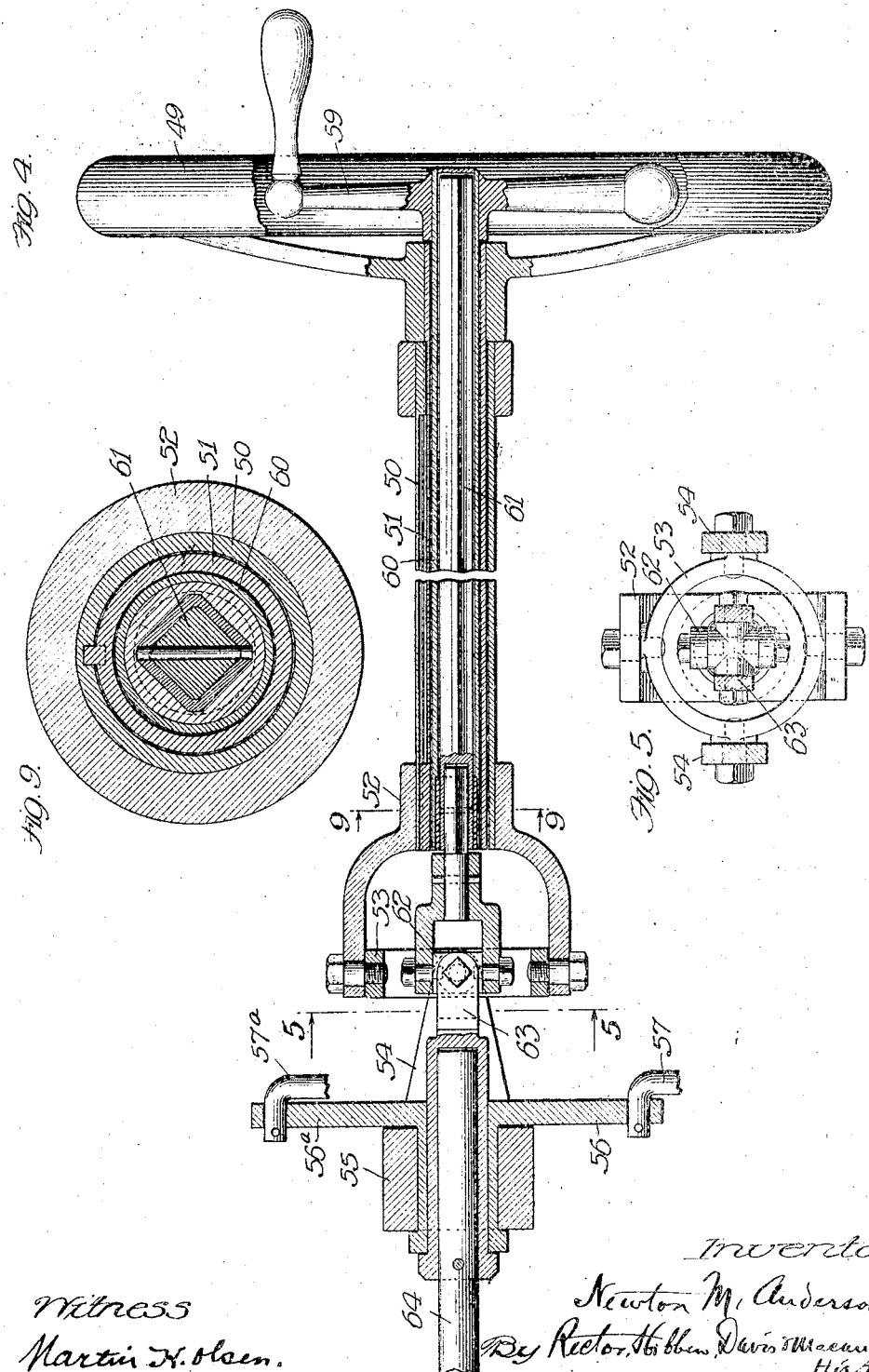

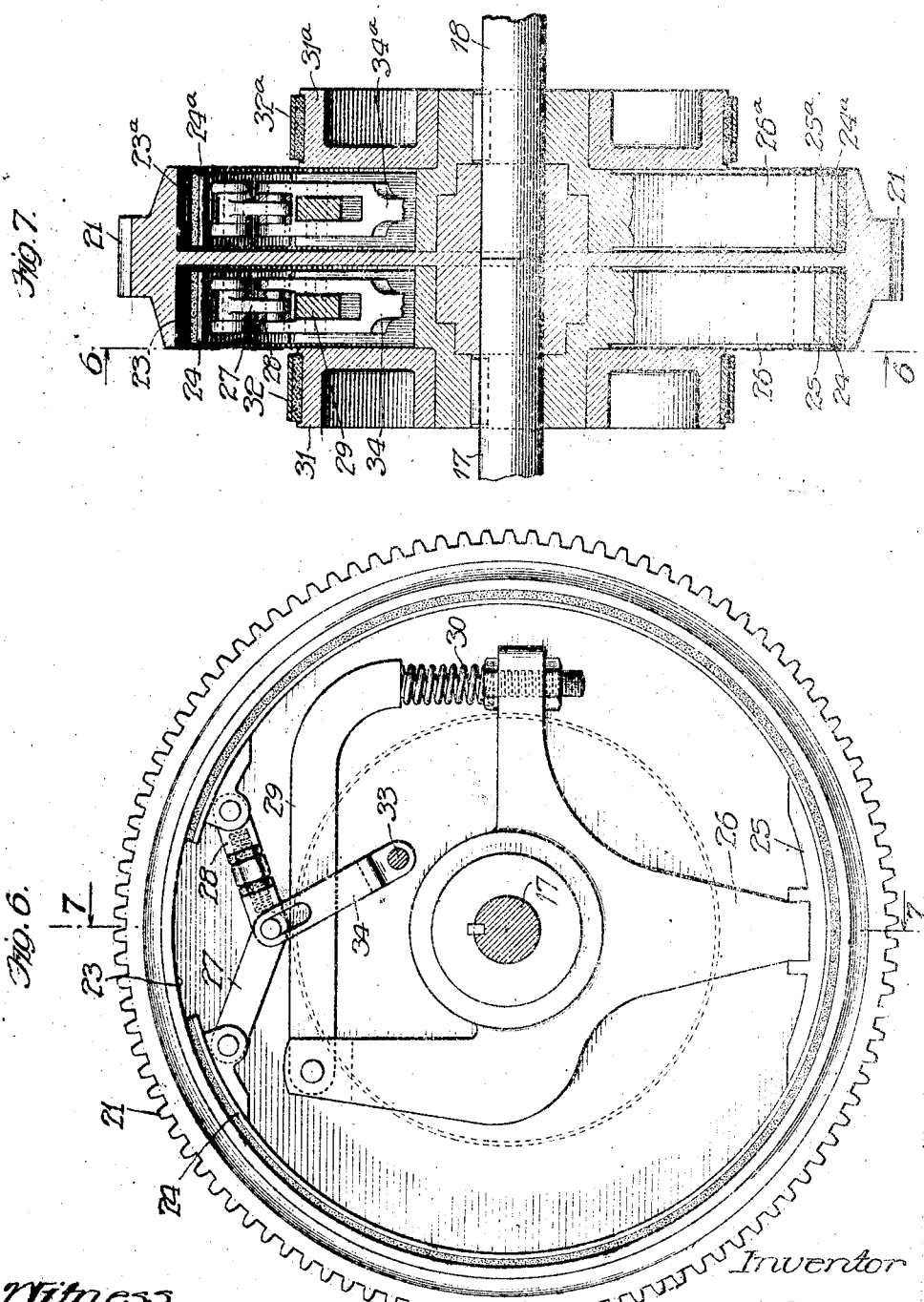

Patented Aug. 3, 1926.

1,594,484

UNITED STATES PATENT OFFICE.

NEWTON M. ANDERSON, OF BEDFORD, INDIANA, ASSIGNOR, BY MESNE ASSIGNMENTS, OF ONE-HALF TO OMER BOWERS, OF BEDFORD, INDIANA, AND ONE-HALF TO LINDSAY J. UNDERWOOD.

TRACTOR.

Application filed May 31, 1921. Serial No. 473,717.

My invention relates to a traction engine of a type designed to be used for a variety of purposes, particularly for the traction of farm implements and cultivating machines, such as wheeled plows, cultivators, harrows, reaping or mowing machines, and which is also suitable for hauling wagons or trucks, and in fact adapted for general use for any of the purposes for which a farm tractor or traction engine may be employed. The object of my invention is to produce a simple, efficient and satisfactory tractor, embodying certain novel features of construction which adapt the machine to the accomplishment of the purposes for which it is intended, and which constitute improvements in the construction of such machines. My novel tractor is of a type having a frame mounted on two traction wheels and adapted to be secured to the front of the cultivator or other implement or vehicle drawn by it, the wheels being arranged to be either simultaneously or independently driven by a motor mounted on the frame to propel and steer the machine, an arrangement which enables the machine to be turned on a short radius and very easily. An important feature of my invention relates to the various combinations and sub-combinations of cooperating parts making up the mechanism for thus driving and steering the machine, more particularly the members concerned in connecting and disconnecting one or both of the driving wheels and the engine, as will be more fully explained in the description hereinafter given. Other features of my invention relate to the telescoping and adjustable controlling means through which the driving and steering mechanisms are controlled, and still other novel features of construction incidental to those mentioned will be apparent from the description given.

In the appended claims in which I have pointed out the essential features of my invention and distinguished it from previous machines so far as known to me, it will be understood that I do not intend to limit my invention to the precise construction described in the specification, and that I intend the claims to embrace all equivalents, modifications and variations of the elements recited, so far as they may include the spirit and substance of my invention. It will further be understood that certain groups of parts and sub-combinations of elements herein described, with suitable modification and adaptation, may be capable of general use in machines and apparatus intended for other purposes and differing in their general organization and construction from the present machine, and that I therefore do not intend to limit the claims to such groups and subcombinations of elements to use in my novel tractor machine only.

Of the accompanying drawings forming part of this specification, Figure 1 is a plan view of my novel tractor; Fig. 2 is a side elevation of the same, the traction wheel at the near side of the machine being omitted; Fig. 3 is a longitudinal section of a portion of the machine, on the line 3—3 of Fig. 1; Fig. 4 is a top plan view of the steering wheel and post and part of the control lever and connections associated therewith; Fig. 5 is a vertical section on the line 5—5 of Fig. 4, looking in the direction of the arrow; Fig. 6 is a side elevation of one of the clutches for connecting the traction wheels to the motor, the brake drum associated therewith being omitted; Fig. 7 is a section on the line 7—7 of Fig. 6; and Figs. 8 and 9 are transverse detail sections on the lines 8—8 and 9—9, respectively of Fig. 3.

The same reference characters indicate the same parts in all the figures of the drawing.

It may first be explained that my invention is embodied in the particular machine herein described and shown in the drawings, in a tractor engine, or tractor proper, and an associated and detachable riding frame which when connected to the tractor converts it into a one-passenger vehicle which can be driven anywhere and is capable of limited use for carrying light loads, pulling a two-wheeled truck, or other trailer, and similar purposes. Proceeding now to a detailed description of the machine, the main frame of the tractor proper may conveniently be formed of side bars 1—1 of channel iron, connected by a front bar 2 and a rear bar 3 riveted thereto, and by intermediate cross and longitudinal members secured thereto and arranged to support the motor A and the associated and connected parts through which the two traction wheels B—B, upon which the frame is mounted, are driven. The radiator C, at the front end of the machine, is supported upon brackets, and a hood D extends rearwardly therefrom over the motor to the top of a gasoline tank E, the upper wall of which is continuous with the hood and extends approximately to the line of the rear frame bar 3. The two traction wheels B—B are rotatably mounted upon the opposite, outer ends of an axle 4 which is secured to the side frame bars 1—1 and are both equipped with internal gears 5 by means of which they may be either simultaneously or independently driven, as hereinafter described.

Upon the crank shaft 6 of the motor is mounted a friction driving wheel 7, the hub of which makes splined connection with such shaft and is formed with a grooved shifter portion 8, operated by a rock shaft 9 journaled in the side frame bars and equipped with a forked rock arm 10 arranged to engage the groove of the shifter, the rock shaft being provided with a crank 11 operated through a connecting rod 11ª by a hand lever 12 which may be set to any desired position of adjustment by a pivoted notched locking bar 13, to cause the rock shaft to be turned and the drive wheel set longitudinally of the shaft at any desired position within its range of adjustment. The periphery of this drive wheel 7 is formed of a material adapted to make frictional engagement with the inner faces of one or the other of two friction disks, marked 14 and 15, which are rigidly secured to a cross-shaft 16 rotatably and also slidably mounted in suitable bearings fixed to the side frame bars 1—1 of the machine. This shaft 16 is adapted to be shifted longitudinally through means which will later be described to bring one or the other of the disks 14 and 15 into engagement with the friction wheel 7 and the other disk out of engagement, or to set the shaft in an intermediate position in which both disks will be disengaged.

The mechanism through which power is imparted from the shaft 16 to the traction wheel B—B may now be described. Rotatably mounted in suitable bearings on the frame of the machine are shaft sections or members 17 and 18 of what may be regarded as a double or divided driving axle, to the outer ends of which are respectively secured small gears or pinions, marked 19 and 20 arranged to respectively engage the two internal gears 15 on the driving wheels of the machine. The inner ends of the shaft sections 17 and 18 rotatably meet each other, and rotatably mounted upon these meeting ends is a gear wheel 21 meshing with a small pinion 22 non-rotatably mounted on the shaft 16 above mentioned.

This shaft 16, it may here be explained, is provided with a pulley 16ª through which the power of the motor may be applied to any of the purposes for which a stationary engine may be used, and in order that the parts driven through the pinion 22 may be wholly disconnected when the motor is used in such manner, such pinion has splined connection with the shaft and is arranged to be shifted by suitable operating connections into and out of position of engagement with the gear wheel 21, in the present instance the pinion being formed with a grooved hub 91 engaged by a reciprocating shifter 92 which is actuated by a crank formed by the upturned inner end of a rock shaft 93 extending longitudinally of the machine, the outer end being equipped with an operating handle 94. The pinion is of slightly greater width than the gear wheel, to permit it—when in engaging position,—to remain in complete meshed engagement throughout the slight longitudinal movement of the shaft 16 from one extreme position of the latter to the other.

Formed integral with or secured to opposite sides of the gear 21 are two clutch drums 23—23ª, which are counterparts of each other and are formed with internal faces adapted to be engaged by incompletely circular expanding clutch rings, formed of stiff resilient metal. Since the parts associated with those two drums are identical, except for their reversal in arrangement, a description of the parts connected with the drum 23 will serve for the parts associated with the drum 23ª, which latter parts, so far as illustrated in the drawings, are indicated by the addition of the exponent "a" to the number used to designate the parts to be particularly described. The clutch ring 24, arranged to cooperate with the drum 23, equidistant from its ends is provided with a socket segment 25 secured to it and arranged to engage one arm of a frame 26 which is rigidly secured to the shaft section 17, the free ends of such ring being connected by a toggle consisting of the links 27 and 28, and one of the links, as 28, being made sectional and having an intermediate section formed with right and left screw threads engaging the two end sections for purposes of adjustment. The knuckle of the toggle is engaged by a lever 29, one end of which is pivoted to the frame 26 and the other end of which is yieldingly tensioned by a compression spring 30 interposed between such end and a portion of said frame in such manner that the spring tends to straighten the toggle, and engage the clutch ring 24 with the drum 23. As before stated, the frame 26 is rigidly secured to the shaft section 17, and the other corresponding frame 26ª is similarly secured to the shaft section 18, so that through the parts thus far described, and when traveling in a straight path, the two traction wheels are both connected to the gear wheel 21 in such manner as to be driven thereby, whether backwards or forwards, in unison.

For the purpose of disconnecting the driving connections of one traction wheel or the other, so that the application of power by the motor to the connected side only will cause the machine to turn toward the disconnected side, I have provided duplicate retarding or brake mechanism respectively connected with the toggles of the brake rings just described. Describing the one connected with the toggle links 27 and 28, there is loosely mounted upon the shaft section 17 a friction wheel or brake drum 31 the periphery of which is adapted to be engaged through manually operable connections by a brake strap 32 so anchored or connected as to be incapable of rotation. This brake drum 31 carries a laterally extending pin 33 to which is pivoted one end of a link 34 whose opposite end is forked and slotted to engage the hinge pin connecting the toggle members. When the two brake straps 32 and 32$^a$ are both free from the respective drums 31 and 31$^a$, such drums will be drawn around in unison with the connected clutch members 24 and 23, and 24$^a$ and 23$^a$, without appreciable resistance, by means of the toggles and connecting links 34—34$^a$, the link 34 assuming the position shown in Fig. 3 when the connections with the motor are such as to rotate the gear 21 in the direction indicated by the arrow and impel the machine forwardly. When, however, through operating connections which will later be described, one of the brake straps, the strap 32, for example, is caused to engage its drum 31, the drag of the drum upon the connecting link 34 will pull upon the toggle links, overcoming the pressure of the spring 30, and cause slippage of the clutch ring 24 against the inner face of the clutch drum 23. The slotted engagement of the link 34 with the hinge pin of the toggle, it will be noted, permits such link to be dragged to a position opposite that shown in Fig. 3, (the lost motion in the machine being described amounting to about one-eighth of a revolution) and when the parts are rotating such link will draw somewhat more strongly upon the leading brake shoe,—that is, the one to the left in said figure,—whereas, when the machine is being driven backward, the other shoe will be the leading one and the position and action of the linkage in question will be reversed. This angularity in the direction of pull, while not essential, is conducive to an effective release of the clutch members.

The result of tightening the brake strap upon the brake drum 31, therefore, is both to exert a direct braking effect on the traction wheel B, which through the frame 36 and toggle linkage is positively connected with such drum, and also, through the pull of the toggle members on the free ends of the clutch ring 24, cause a slippage of the clutch ring 24, though not a completely free release of such ring from the clutch drum 23. The traction or driving wheel to which the parts mentioned are connected is therefore retarded and steadied and the driving wheel on the opposite side of the machine, driven under full power of the motor, is caused to swing about it and in this manner, through the application of the motive power to one or the other of the driving wheels, the tractor may be easily and effectively guided, without the very considerable physical exertion required to control the steering mechanism usually employed in machines of this kind.

The rear end of the frame of the tractor is provided with a short swinging tongue 35 which, a shown, may conveniently consist of a wooden beam 35 to which are secured upper and lower fork members, marked respectively 37 and 38, which at their ends are pivotally connected with the frame on a vertical axis, by means of a king bolt 80 rigidly secured to the fork members and journaled in a lower bearing formed in a cross-bar 39 adjacent the rear end of the frame and an upper bearing in a frame bracket 40 secured to said cross-bar and strengthened by suitable braces. The rear end of the tongue is provided on its under side with a rocking attaching device consisting of a bar 41 formed with upturned lugs 42 at its ends pivoted to the depending lugs of a bar 43 bolted to the tongue.

The supplementary, detachable riding frame before mentioned consists of an axle and connected frame members mounted on a pair of wheels and provided with a seat for the driver of the machine. This riding frame is constructed with an arched bar 44, clamped at its opposite ends to the axle and to diagonal brace bars 45 which extend from near the ends of the axle towards each other and are secured to the forward end of the reach 46, and the tongue of the tractor is supported on this arched bar by a bolt passing through the bar 41 of the supporting device and such arched bar.

It may here be explained that the arrangement and construction of the parts is such that the bar 41 will rest upon and may be bolted to the front frame bar of tractors of standard construction, the longitudinal pivoting of such bar providing for a sidewise rocking or oscillation of the cultivator in passing over uneven ground.

The bars 45 are bent to extend parallel with each other forwardly of the end of the reach 46, and are bolted to depending bars 47 which are secured at their upper ends to the lower fork members 38 of the tractor tongue, and the lower ends of the bars 47 are connected to diagonal brace bars 48 extending upwardly and forwardly and connected by pivot bolts to the forward portion of the tractor frame. When the riding frame is detached and the tractor secured to a cultivator or other machine the bars 47 and 48 may be folded up towards each other under the machine and secured by bolts, or if preferred may be entirely disconnected.

The mechanism through which the shaft 16 is shifted longitudinally to cause it to be rotated in one direction by the friction disk 14, or in the other direction by the disk 15, or be disconnected from the motor in neutral position, for the purpose of driving the machine forwardly, or rearwardly or disconnecting the motor from the driving wheels entirely, is controlled by a reversing and control crank mounted upon the rear of the steering wheel. The steering wheel, when turned in one direction from a neutral, intermediate position, is arranged to tighten the brake strap 32, and when turned in the other to tighten the brake strap 32$^a$, to brake the connected driving wheel and simultaneously disconnect it from the motor and thus cause the tractor to turn towards the side so affected. Both the reversing crank and the steering wheel are adjustably connected with the parts operated by them by means of extensible, flexible connections, so that they may be brought into convenient position for operation by the driver from the seat of the particular machine to which the motor is attached, throughout a wide range of adjustment. Describing first the steering connections, the steering wheel marked 49, is secured to the tubular inner member 50 of a sectional telescoping post of which the tubular outer section or 51, making splined engagement with the inner section, is rigidly secured to the forked member 52 of a gimbal joint or coupling consisting of such forked member, a connecting ring 53, and a second forked member 54, which latter is formed with a tubular hub rotatably and non-slidably mounted in a bearing carried by a bearing bracket 55 secured to the frame bracket 40 before mentioned. The member 54, which forms a lower terminal section of the steering wheel mechanism, universally connected as described to the telescoping post section of such mechanism is formed with laterally extending arms 56—56$^a$, to the extremities of which are pivoted the upper ends of rods 57—57$^a$ which are loosely seated in the hollow upper ends of rods 58—58$^a$ pivoted to the outer ends of levers 90—90$^a$, these levers being pivoted intermediately and at their inner ends to the upper and lower ends, respectively of the brake straps 32 and 32$^a$, which are anchored, intermediate their length, to a stationary part of the frame. When the steering wheel is turned in a direction to depress the arm 56, or 56$^a$, as the case may be, it is apparent that such arm will act through the telescoping rod members to tighten the brake strap on the side affected, while on the opposite side the upper rod member will be lifted idly without affecting the brake strap on that side of the machine.

The control lever, marked 59, is secured to the rear end of a tube 60 slidingly received within the tubular inner member 50 of the steering wheel post or shaft, and such tube 60 slidingly engages an approximately square rod 61, the edges of such rod being slightly rounded. The front end of the tube 60 is provided with an inset block 62 having internal faces slidingly engaging the rod 61, whereby the rod will be caused to turn with the tube when the control lever handle is turned. To the front end of the rod is secured one of the forks of a second universal joint, similar to and arranged centrally within the ring 53 of the universal joint above described, the terminal member 63 of the inner universal coupling being rotatably and non-slidably mounted in the hub of the member 54 of the first-mentioned outer coupling. This terminal member is secured to or integral with a screw rod 64 which engages a block 65 pivoted upon the inner end of an irregularly shaped rocking lever 66 which has a horizontal upper portion 66$^a$, a vertical intermediate portion 66$^b$—66$^b$ connected with an intermediate horizontal portion to provide for a pivotal mounting, and a lower horizontal arm 66$^c$. The lever 66 is pivotally mounted on a vertical rod 67 secured to the upper and lower members of a three-sided bracket secured to the tractor frame.

The end of the lower arm 66$^c$ of the lever is pivoted in the slotted end of a shifting member 68 which rotatably and nonslidably engages the end portion of the shaft 16 outside its bearing in the frame, so that by rotating the control crank to rock the lever the shaft 16 will be shifted longitudinally in its bearings in the frame to any position desired. The control thus attained is extremely sensitive, and by varying the degree of pressure of the friction wheel 7 upon the driving disks 14 or 15, and permitting a greater or less degree of slippage, any desired portion of the maximum power of the engine can be transmitted. Furthermore, in descending a hill, the transmission is shifted to reverse position, and power then applied acts as a brake.

The extensible or telescoping shafts connected to the reversing crank and steering wheel are supported in position by an extensible post 69 having its tubular lower portion secured to the tongue 35 and an upper portion 69$^a$ arranged to be secured in the lower portion at any desired height, as by means of the set screw 70. The top of the member 69$^a$ is formed with slotted forks 71 adapted to receive studs 72 projecting from a ring surrounding the outer tube 51 of the telescoping shaft members.

In order to lock the riding frame against any swinging movement upon the vertical axis upon which the tongue 35 is mounted, and thus cause the machine to maintain a straight course except when the steering wheel is rotated to make a turn, I have provided an automatically releasable locking device. This device consists of a segmental bar 73 attached to the rear cross-bar 3 of the frame and formed with a central orifice adapted to receive a latching pin 74 extending through the upper reversely turned end of a horizontal bar 75 bolted to the inner end of the tongue. The latch pin is pivotally connected at its upper end to the rear end of a horizontal lever 76 which is intermediately pivoted to a bracket 77 secured to the upper forks 37 of the tongue; and at its forward end is pivoted to a plunger 78 which is slidingly seated in the hollow or tubular upper end of the king bolt 80, the bolt being slotted in the path of the lever to permit such pivotal connection. The top of the plunger has a disk-shaped, rounded crown adapted to be depressed by one or the other end of a laterally extending rounded block or cross-bar 79 secured to the bottom of the forward member of the outer universal joint before mentioned. By turning the steering wheel in either direction, therefore, the latching pin 74 is lifted out of engagement with the orifice in the segment 73, but whenever travel in a straight path is resumed the orifice will come into alignment with the pin and the latter will drop into engagement again.

While the particular construction of the motor used as a source of power for my tractor forms no part of my present invention it should be stated that it is provided with an adjustable speed governor connected with the throttle and operating to maintain a practically constant motor speed under any variation of load between full load and when the engine is running idly. In the interest of simplicity I have made no provision for adjusting the governor to vary the speed at which the tractor will be driven by connections associated with the steering wheel and which may be manipulated by the driver while the machine is in motion, but it is obvious that mechanism for that purpose may be added if desired, and also connections for advancing or retarding the spark.

I claim:—

1. In a tractor having a pair of independently rotatable traction wheels, a motor, duplicate trains of power-transmitting mechanism connected to said traction wheels, a reversing mechanism intermediate said motor and both said trains of power-transmitting mechanism, a steering wheel having its shaft cooperatively connected to both said trains of power-transmitting mechanism and arranged to disconnect either train at will, and a control lever having a shaft which is journaled concentrically in said steering wheel shaft and is connected with said reversing mechanism.

2. In a tractor having a motor and a pair of independently rotatable traction wheels, the combination of steering wheel mechanism including a lower terminal section journaled in the machine frame and cooperatively connected to both wheels and arranged to disconnect the driving means for either wheel at will to steer the machine and also including a post section universally connected with said lower section and equipped with a steering wheel, reversing mechanism intermediate said motor and both said traction wheels, and control mechanism including a terminal member journaled in the lower terminal section of the steering wheel mechanism and connected to said reversing mechanism and also including a post section universally connected with said terminal member of the control mechanism and equipped with an operating crank.

3. In a tractor having a main frame and driving wheels supporting said frame, and a laterally swinging supplementary wheeled frame pivoted to said main frame, steering mechanism for steering said driving wheels, means for automatically locking said main and supplemental frame in direct longitudinal alignment, and means governed by said steering mechanism for releasing said locking mechanism.

4. In a tractor, locking and releasing means according to claim 3 in which said main frame is equipped with an orificed segment, and a member secured to said pivoted supplementary frame is equipped with a locking bolt actuated by said steering mechanism.

5. In a tractor, locking and releasing means according to claim 3 in which said main frame is equipped with an orificed segment, and a member secured to said pivoted supplementary frame is equipped with a locking bolt and in which said steering mechanism includes a post arranged to be turned in either direction from intermediate neutral position, said post being cooperatively connected with said bolt to release it when turned from neutral position.

6. In a tractor having a main frame and driving wheels supporting such frame, a forked beam pivoted to said frame on a vertical axis, a supplementary wheeled frame secured to said beam, steering mechanism for steering said driving wheels and including an oscillatory post intersecting the pivotal axis of said beam, said post being connected with a cam adjacent the point of intersection, a reciprocating plunger mounted coaxially of said pivotal axis and arranged to cooperate with said cam, a locking bolt mounted in said beam and connected with said plunger, and an orificed locking segment secured to said main frame.

7. A tractor mechanism according to claim 6 in which said forked beam is secured to a king bolt pivoted in the main frame, and said reciprocating plunger is mounted in an axial bore at the top of such king bolt.

8. In a tractor or other machine, clutch mechanism comprising a driving drum having an internal cylindrical clutching face, a spring-tensioned expanding clutch member secured to a shaft to be driven, a toggle operable to contract said expanding clutch member, a brake member rotatably mounted concentrically of said expanding clutch member and cooperatively connected with said toggle, a cooperating brake member anchored to the frame of the machine, and means for engaging said brake members.

9. A clutch mechanism according to claim 8 in which said first mentioned brake member is a brake drum and said drum is connected by a link with the knuckle of said toggle.

10. A clutch mechanism according to claim 8 in which said first mentioned brake member is a brake drum and said drum is connected by a link with the knuckle of said toggle, said link having a slotted attachment permitting a limited degree of lost movement in either direction.

11. A clutch mechanism according to claim 8 in which said expanding clutch member is intermediately anchored to a frame secured to the driven shaft and said toggle is mounted on said frame and is arranged to engage the opposite branches of such member.

12. A clutch mechanism according to claim 8 in which said expanding clutch member is intermediately anchored to a frame secured to the driven shaft and said toggle is mounted on said frame and is arranged to engage the opposite branches of such member, and in which also said expanding member is tensioned by a spring-stressed lever mounted on said frame and bearing against the knuckle of said toggle.

13. A clutch according to claim 8 in which said shaft is equipped with a frame and said expanding clutch member is an open metallic ring, anchored intermediate its ends to said frame.

14. In a tractor having a motor and a pair of independently rotatable traction wheels, the combination of steering wheel mechanism including a hand wheel and telescoping splined tubular post sections, the lower post section being rotatively mounted in the machine frame and being provided with a hollow universal joint and being cooperatively connected with both said wheels and arranged to disconnect the driving means for either wheel at will to steer the machine, transmission mechanism intermediate the motor and both said traction wheels, and control mechanism including an operating handle and splined post sections arranged inside the tubular steering wheel post sections and connected to said transmission mechanism, said control post sections being provided with a universal joint inside said first mentioned joint and concentric therewith.

15. In a tractor having a motor and a pair of independently rotatable traction wheels, the combination of steering wheel mechanism including a hand wheel and telescoping splined post sections, the lower such section being provided with a universal joint and being cooperatively connected with both said wheels and arranged to disconnect the driving means for either wheel at will to steer the machine, transmission mechanism intermediate the motor and both said traction wheels, and control mechanism including an operating handle and telescoping splined post sections connected to said transmission mechanism, the lower one of said last mentioned post sections being provided with a universal joint and all of said post sections being concentrically arranged and said universal joints concentric, and the outer such joint being rotatably mounted in the machine frame.

16. In a tractor having a pair of independently rotatable driving wheels, a motor, a pair of clutch drums driven in unison by said motor, a pair of cooperating clutch members respectively connected with said traction wheels, a pair of brake mechanisms respectively connected to said traction wheels, each mechanism including a brake strap and a brake drum, said drum being connected to said second mentioned clutch member, and means for operating said brake straps comprising an oscillatable steering wheel and post, a pair of opposite laterally extending arms connected to said post, rods respectively connected to the outer ends of said arms, and levers pivoted to said arms and cooperatively connected with said brake straps.

17. In a tractor having a pair of independently rotatable driving wheels, a motor, a pair of clutch drums driven in unison by said motor, a pair of cooperating clutch members respectively connected with said traction wheels, a pair of brake mechanisms respectively connected to said traction wheels, each mechanism including a brake strap and a brake drum, said drum being connected to one of said second mentioned clutch members, and means for operating said brake straps comprising an oscillatable steering wheel and post, a pair of opposite laterally extending arms connected to said post, rods respectively connected to the outer ends of said arms, and levers respectively pivoted at their outer ends to said arms, and also pivotally connected at their inner ends and at intermediate points to the opposite ends of said straps.

18. In a tractor according to claim 16 means for operating said brake straps in which said rods are sectional and telescoping, whereby upon the depression of one arm the connected rod will be depressed and cause the associated brake strap to be tightened and the sections of the other rod will be separated idly.

NEWTON M. ANDERSON.